United States Patent
Andrews et al.

(10) Patent No.: US 8,457,237 B2
(45) Date of Patent: Jun. 4, 2013

(54) POWER CONTROL IN A WIRELESS COMMUNICATION SYSTEM

(75) Inventors: Edward Andrews, St. Andrews (GB); Jonathan Wallington, Portishead (GB); Carlo Luschi, Oxford (GB)

(73) Assignee: Icera Inc., Wilmington, DE (US)

( * ) Notice: Subject to any disclaimer, the term of this patent is extended or adjusted under 35 U.S.C. 154(b) by 80 days.

(21) Appl. No.: 12/808,167

(22) PCT Filed: Dec. 10, 2008

(86) PCT No.: PCT/EP2008/067248
§ 371 (c)(1),
(2), (4) Date: Oct. 12, 2010

(87) PCT Pub. No.: WO2009/077409
PCT Pub. Date: Jun. 25, 2009

(65) Prior Publication Data
US 2011/0019754 A1    Jan. 27, 2011

(30) Foreign Application Priority Data
Dec. 14, 2007  (GB) .................................. 0724419.7

(51) Int. Cl.
*H04B 7/02*    (2006.01)
*H04L 1/02*    (2006.01)

(52) U.S. Cl.
USPC .............................. 375/267; 375/260; 375/340

(58) Field of Classification Search
USPC ........................................ 375/267, 260, 340
See application file for complete search history.

(56) References Cited

U.S. PATENT DOCUMENTS

| | | | |
|---|---|---|---|
| 6,374,118 B1 * | 4/2002 | Toskala et al. | 455/522 |
| 2003/0092459 A1 | 5/2003 | Blessent | |
| 2005/0276248 A1 | 12/2005 | Butala et al. | |
| 2007/0142075 A1 * | 6/2007 | Billon et al. | 455/522 |

FOREIGN PATENT DOCUMENTS

| | | |
|---|---|---|
| EP | 1801996 A1 | 6/2007 |
| WO | 9953701 | 10/1999 |
| WO | 2009077409 A1 | 6/2009 |

* cited by examiner

*Primary Examiner* — Shuwang Liu
*Assistant Examiner* — Nader Bolourchi

(57) ABSTRACT

A method of power control in a wireless communication system wherein blocks are transmitted from a transmitter to a receiver on multiple wireless transport channels. The method comprises comparing a target signal quality value with a received signal quality value and providing the results of the comparing step to the transmitter to adjust transmit power based on the comparing step. A corresponding receiver is also provided.

19 Claims, 3 Drawing Sheets

POWER CONTROL IN A WIRELESS COMMUNICATION SYSTEM

CROSS-REFERENCE TO RELATED APPLICATION

This application is the National Stage of, and therefore claims the benefit of International Application No. PCT/EP2008/067248 filed on Dec. 10, 2008, entitled "POWER CONTROL IN A WIRELESS COMMUNICATION SYSTEM," which was published in English under International Publication Number WO 2009/077409 on Jun. 25, 2009, and has priority based on GB 0724419.7 filed on Dec. 14, 2007. Each of the above applications is commonly assigned with this National Stage application and is incorporated herein by reference in their entirety.

TECHNICAL FIELD

The present invention relates to power control in a wireless communication system.

BACKGROUND

FIG. 1 is a schematic block diagram indicating the main functional components of a 3GPP wideband code division multiple access (WCDMA) receiver. Reference numeral 2 denotes an antenna which receives a wireless transmission and supplies it in analog form to RF and IF stages 4. A receiver front end 6 includes the functions of analog to digital conversion and supplies digital samples to a signal detection block 8. The signal detection block 8 can be implemented in a number of ways and is responsible for de-scrambling and de-spreading the received coded signal samples. For each transmission time interval (TTI) data is received which comprises a plurality of transport channels (TrCH) multiplexed onto a dedicated physical channel (DPCH in 3GPP WCDMA). The signal to interference plus noise ratio (SIR) of the received signal can be measured from the output of the signal detection block 8, in an SIR estimation block 9. The output of the signal detection block is then fed to a channel decoding block 10. As shown in FIG. 1, after signal detection and channel decoding the decoded data bits are supplied to a Cyclic Redundancy Check (CRC) block 12. The CRC check indicates whether or not the data block has been correctly decoded.

For interference-limited wireless systems, such as those based on CDMA technology, link adaptation is performed by a Transmit Power Control (TPC) mechanism, which ensures that sufficient but not excessive power is transmitted to achieve an adequate received signal quality. In a 3GPP WCDMA system, the power control mechanism comprises two parts: 1) a so-called "outer-loop" algorithm 14 that sets and adjusts a target signal to interference plus noise power ratio (SIR) in order to meet a Block Error Rate (BLER) target set by a network; and 2) a so-called "inner-loop" algorithm 16 that provides fast feedback to the transmitter in order that the transmitter can adjust its transmitted signal power so that the receiver SIR target is met. The inner-loop transmit power control 16 is typically based on the comparison between a target SIR ($SIR_{target}$) and an SIR estimated from the received signal ($SIR_{est}$). The outer-loop mechanism 14 increases or decreases the SIR target in response to the receipt of block error information, which is typically derived by the pass/fail of the CRC check 12. If a data block is received correctly (CRC pass) then the SIR target is decreased; if a data block is received incorrectly (CRC fail) then the SIR target is increased. In a typical implementation, the amount the SIR target is decreased following a correctly decoded block is equal to some step size (in dB) multiplied by the target block error rate, and the amount the SIR target is increased following an incorrectly decoded block is equal to the step size multiplied by one minus the target block error rate. For example, for a 10% BLER target and a 1 dB step size, the SIR target will be decreased by 1*0.1=0.1 dB following a good block and increased by 1*(1−0.1)=0.9 dB following a bad block. This has the effect that, for typical BLER targets, many more good blocks are required to lower the target than bad blocks to raise it by the same amount. In normal circumstances, the inner-loop power control is able to adjust the transmitted power to meet the new target in a short period (in WCDMA the power can be changed by 1 dB per slot).

In the case where multiple transport channels are multiplexed on a single Dedicated Physical Channel (DPCH) then the DPCH's SIR target is derived from the SIR targets of the individual TrCHs (e.g., by taking the largest SIR target). If one or more of the TrCHs carries bursty traffic, e.g., from a Signaling Radio Bearer (SRB), with large periods of inactivity during which its SIR target is not updated, the DPCH's SIR target may be pinned at an unnecessarily high level and will be unable to respond to either improvements in the radio environment or the looser SIR requirements of the other (active) TrCHs. Such behavior has a negative effect on cell capacity and may lead to the call being dropped by a high layer Radio Resource Management (RRM) algorithm.

It is an aim of the present invention to provide an outer-loop power control mechanism which obviates or at least mitigates the above disadvantages.

SUMMARY

One aspect of the invention provides a method of power control in a wireless communication system wherein blocks are transmitted from a transmitter to a receiver on multiple wireless transport channels, the method comprising comparing a target signal quality value with a received signal quality value of the blocks and providing the results of the comparing step to the transmitter to adjust transmit power based on the comparing step, the method comprising the steps of: determining individual target values for each of the multiple wireless transport channels; deriving the target signal quality value from the individual target values; determining if one of the multiple wireless transport channels has been inactive for a period and, if so, providing the target signal quality value at a level which is lower than an individual target value for the inactive transport channel in the case where the individual target value exceeds a highest target value of active transport channels, and at a level corresponding to the target value on the active transport channels if the highest target value of the active transport channel exceeds that on the inactive transport channel.

Another aspect of the invention provides a wireless receiver for use in a wireless communication system wherein blocks are transmitted from a transmitter to the receiver on multiple wireless transport channels, the receive comprising: an inner-loop power control mechanism operable to compare a target signal quality value with a received signal quality value and provide the results of the comparing step to the transmitter to adjust transmit power; means storing individual target values for each of the multiple wireless transport channels; an outer-loop power control mechanism operable to derive the target signal quality value from the individual target values; and means for monitoring receipt of blocks to determine if one of the multiple wireless transport channels has been inactive for a period and, if so, providing the target signal quality value at a level which is lower than an individual target value for the inactive transport channel in the case where the individual target value exceeds a highest target value of active transport channels, and at a level corresponding to the target value of the active transport channels if the highest target value of the active transport channel exceeds that on the inactive transport channel.

The invention also provides a wireless communications system comprising a transmitter arranged to transmit wireless data on multiple transport channels and a receiver as defined hereinabove.

BRIEF DESCRIPTION OF THE DRAWINGS

For a better understanding of the present invention and to show how the same may be carried into effect, reference will now be made by way of example to the accompanying drawings in which.

DETAILED DESCRIPTION

The embodiments of the invention described herein provide a mechanism to regulate the SIR targets of inactive transport channels as part of a multi-TrCH outer-loop power control algorithm.

Figure 2:
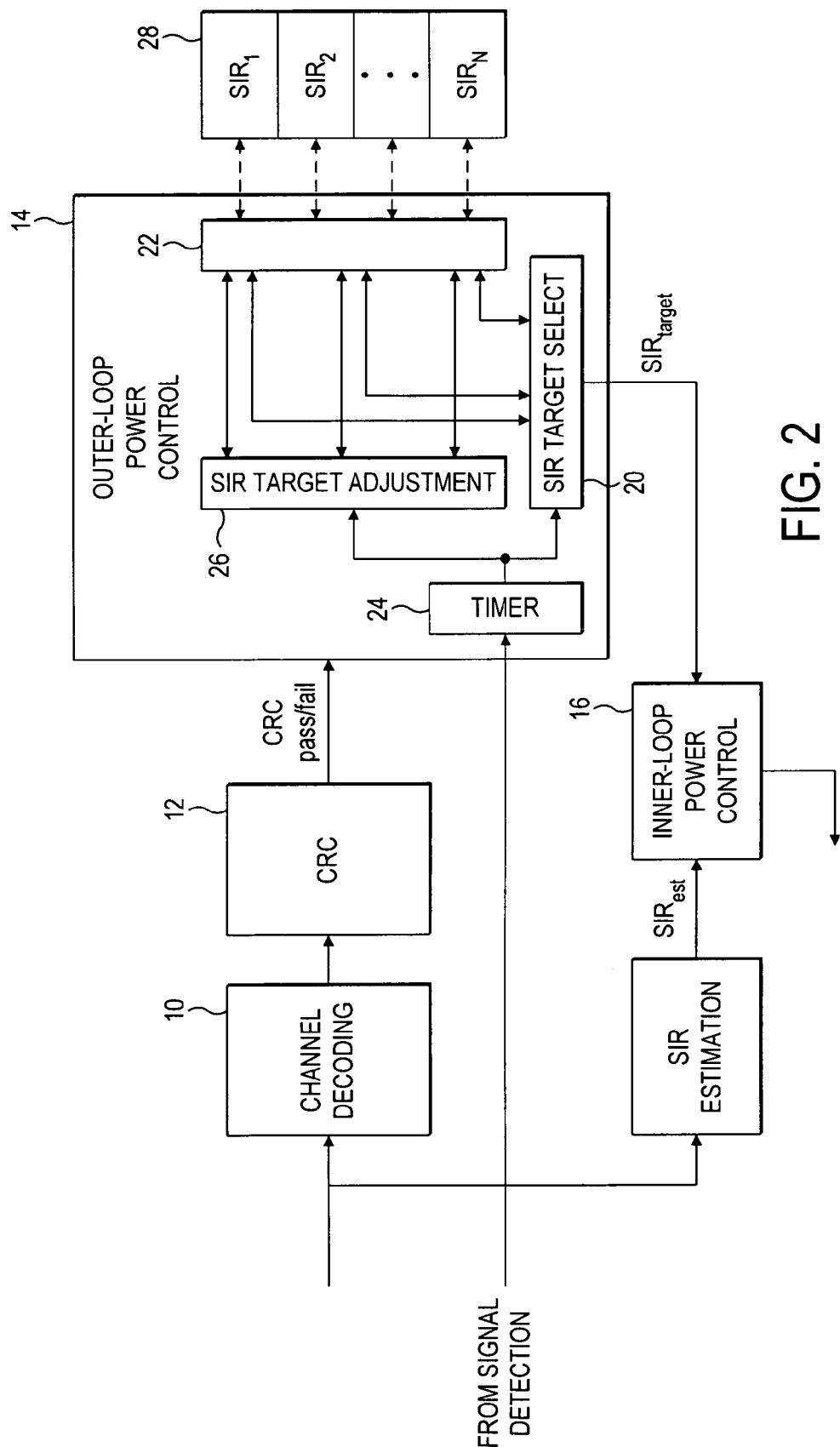
FIG. 2 is a schematic block diagram of components of a receiver illustrating an embodiment of the present invention.

FIG. 2 is a schematic block diagram of an embodiment of the present invention shown as functional blocks. It will readily be appreciated that in practice these blocks can be implemented by software or firmware in a suitably programmed processor.

Figure 1:
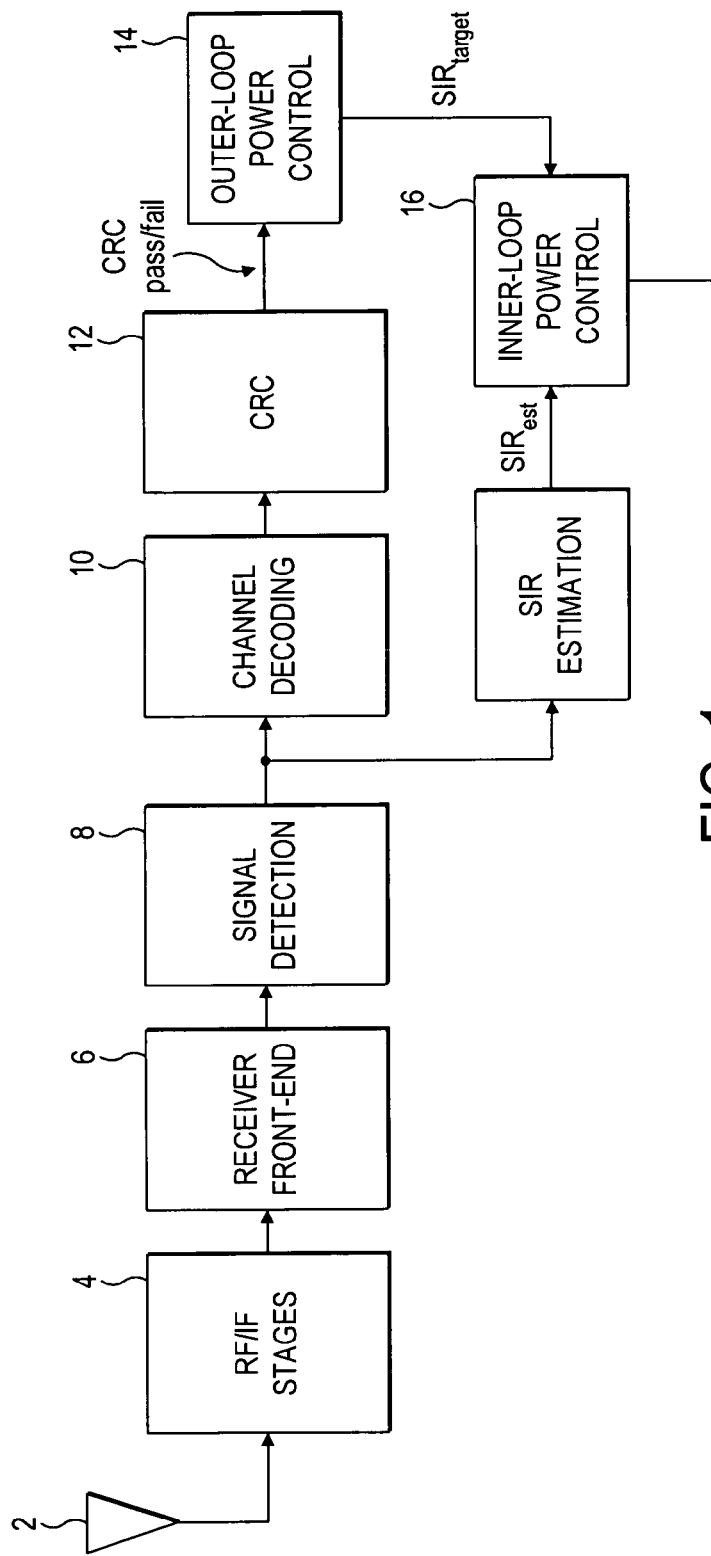
FIG. 1 is a schematic block diagram of a receiver.

FIG. 2 shows the channel decoding block 10 and the CRC check block 12, the outer-loop power control block 14 and the inner-loop power control block 16. These are similar to the corresponding blocks discussed above with reference to FIG. 1, but the outer-loop power control block has an additional select function 20 which will be discussed in more detail hereinafter.

In addition to these blocks, FIG. 2 illustrates a compare function 22, a timer function 24 and an adjustment function 26. For each transport channel multiplexed onto a dedicated physical channel, a separate SIR target is maintained. These are shown diagrammatically in memory block 28 as $SIR_1$, $SIR_2$, ... $SIR_N$. It will readily be appreciated that the memory block is diagrammatic only and that these targets can be held in any suitable location. What is important is that each target is associated with a respective transport channel. The set of transport channel SIR targets is initialized to some set of typical values $\{SIR_{init}\}$ at call setup, where the value of $SIR_{init}$ for a particular transport channel may depend upon a number of factors related to, for instance, the properties of the DPCH (e.g., spreading factor) or the properties of the transport channel (e.g., BLER target). The embodiments of the present invention described herein describe how the SIR target which is used by the inner-loop power control 16 is determined from the respective targets held for the transport channels. The SIR target adjustment function 26 adjusts the individual SIR targets for the transport channels based on activity on the individual transport channels, as monitored by the inactivity timer function 24 and also based on the relative value of the SIR targets for the transport channels as determined by the compare function 22. In general terms, the mechanism operates as follows.

The signal detection block 8 detects incoming blocks for each transport channel TrCH for example by BTFD or by decoding the TFCI on the DPCCU. If, for some TrCH, the period of time (as monitored by the timer function 24) in which there have been no data blocks detected (with either good or bad CRCs) exceeds some threshold $\tau_{inactivity}$, and that TrCH's SIR target exceeds that of the active TrCH associated with the highest SIR target (as determined by the compare function 22), then the inactive TrCH should have its SIR target reduced by a predefined amount by the SIR target adjustment function 26. This process should be repeated until the inactive TrCH either becomes active again (i.e., the receiver detects some data blocks) or its SIR target drops below that of the active TrCH which currently has the highest SIR target. Optionally, a margin (either an additive quantity in linear scale or a multiplicative factor in linear scale, equivalent to an additive quantity in dB) may be applied so that the inactive target can drop below the active target. In the event that there are no active TrCHs, then those TrCHs with SIR targets greater than a certain value (for example $SIR_{init}$) should lower their targets towards that value and those TrCHs with SIR targets less than that value should increase theirs towards that value.

The SIR target select function 20, if used, allows the SIR targets of inactive TrCHs to be excluded from the DPCH SIR target calculation. The inactive TrCH's target can then either be left unchanged, decayed towards $SIR_{init}$ or set to $SIR_{init}$ after some time.

Figure 3:
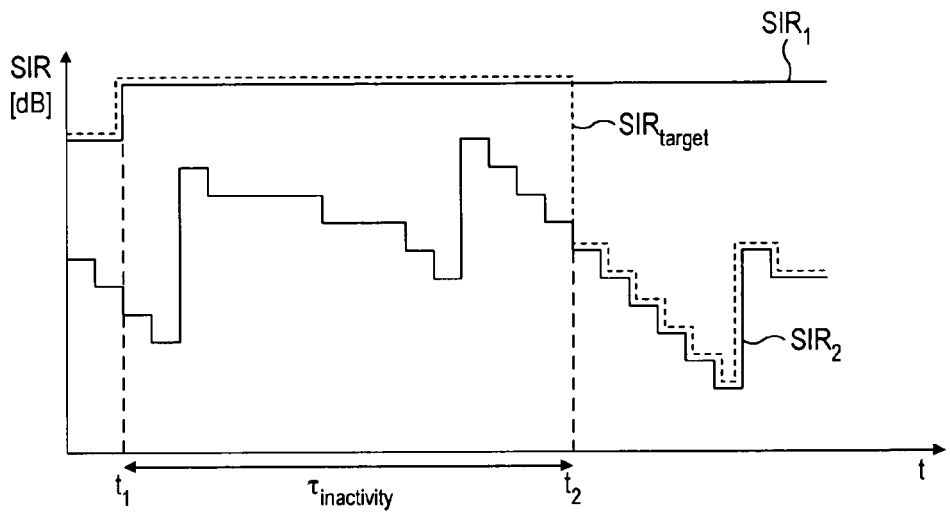
FIG. 3 is a graph of SIR target against time showing exclusion of the target value of an inactive channel.

FIG. 3 is a graph showing the relationship over time between the SIR targets for two transport channels. $SIR_1$ denotes the SIR target for a first transport channel $TrCH_1$, and $SIR_2$ denotes the SIR target value for a second transport channel $TrCH_2$. The first transport channel receives a block of data at time $t_1$ and then subsequently is inactive. Its SIR target value therefore remains unchanged after receipt of the block at time $t_1$. As this target remains higher than the target $SIR_2$ for the second transport channel $TrCH_2$, then the instantaneous largest target at any given time is $SIR_1$ and this is used as the target value $SIR_{target}$ for the inner-loop power control 16 (shown as a dashed line in FIG. 3). However, at time $t_2$, following a period $\tau_{inactivity}$ which represents the threshold monitored by the timer function 24, the target value $SIR_1$ of the first transport channel is removed by the SIR target select function 20 from being taken into account to set the target value $SIR_{target}$ for the inner-loop power control 16. Thus, after time $t_2$ at the end of the period of inactivity $\tau_{inactivity}$, the SIR target value supplied to the inner-loop power control follows the target value for the second transport channel $SIR_2$. This is illustrated by the dashed line which represents the target value SIR which is supplied from the outer-loop power control block to the inner-loop power control block 16.

Figure 4:
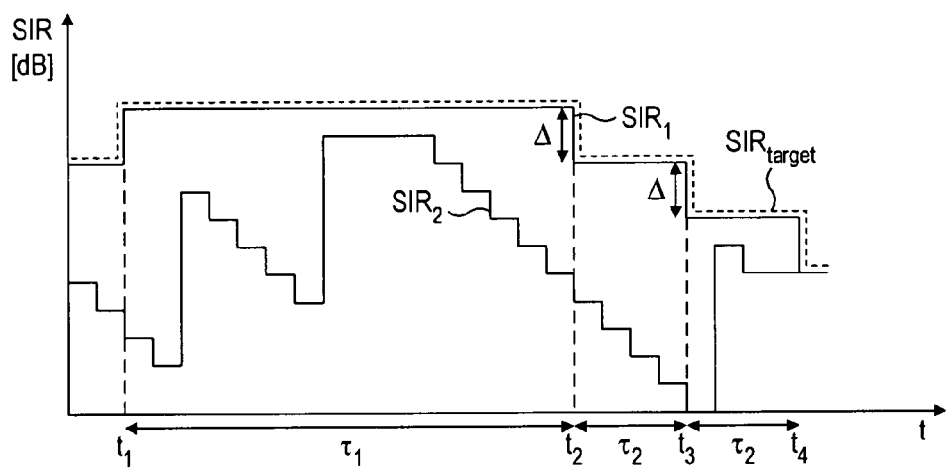
FIG. 4 is a graph of SIR target versus time showing reduction of the target value of an inactive channel.

FIG. 4 is a graph showing the change of SIR targets with time for an alternative implementation. In the implementation of FIG. 4, a first period of inactivity $\tau_1$ is monitored from the time at which a block is received on the first transport channel $TrCH_1$. However, on expiry of this time period $\tau_1$ (at time $t_2$), instead of being removed from being taken into account to adjust the SIR target for the inner loop power control, the value of the target for the transport channel $TrCH_1$ is reduced by an amount $\Delta$, but is still taken into account when determining the target value $SIR_{target}$. Thus, in contrast to the arrangement of FIG. 3, where at that point the target value $SIR_{target}$, starts to follow the target $SIR_2$ of the second transport channel $TrCH_2$, in this case the target $SIR_{target}$ continues to follow the target value $SIR_1$ of the first transport channel $TrCH_1$. The reduction of the target value $SIR_1$ is carried out by the SIR target adjustment function 26. After a subsequent period $\tau_2$, if the first transport channel $TrCH_1$ remains inactive, its target value $SIR_1$ is reduced again by the amount $\Delta$ (at time $t_3$). It continues to provide the target $SIR_{target}$ because it is still above the target value $SIR_2$ for the second transport channel $TrCH_2$. After a subsequent period $\tau_2$ (at time $t_4$) the target value $SIR_1$ is reduced again by an amount $\Delta$. At this point, $t_4$ in FIG. 4, it can be seen that any subsequent reduction in the target value $SIR_1$ would bring it below the target value $SIR_2$ for the second transport channel $TrCH_2$. Therefore, the timer is stopped and no subsequent reductions are made to the target value $SIR_1$ unless the active transport channel target drops below the inactive transport channel's target again for an inactivity period $\tau_1$. That is, if $SIR_2$ (on the active transport channel) falls, the timer is restarted and the process described above begins again. If, conversely, the target value $SIR_2$ increases then it is clear that this target will be used as the target value $SIR_{target}$ for the inner-loop power control until such time as it drops below that of the inactive channel again.

Figure 5:
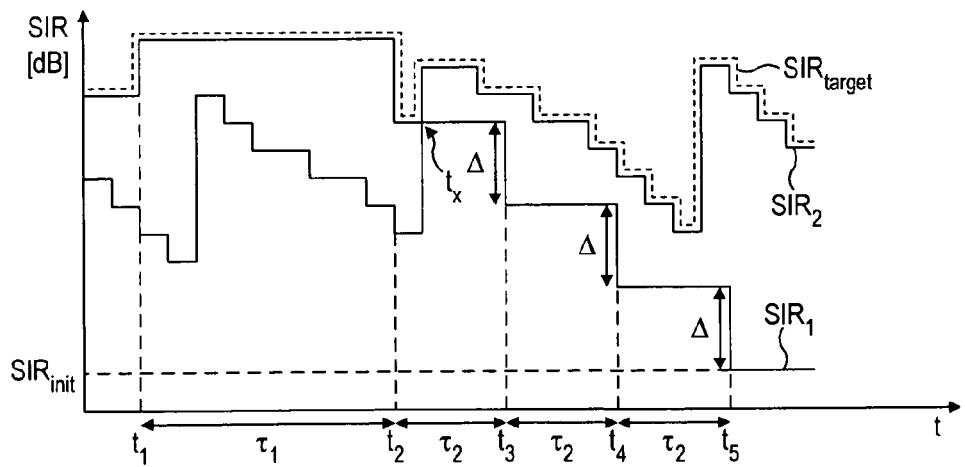
FIG. 5 is a graph of SIR target versus time showing a variant in which the target value of an inactive channel is reduced.

FIG. 5 is a diagram illustrating the change of SIR target with time representing a variation on the implementation of FIG. 4. In this case, the target for the inactive transport channel $TrCH_1$ continues to be reduced by an amount $\Delta$ at the end of each period $\tau_2$ until it reaches an initial value $SIR_{init}$. This is done regardless of its relationship to the target value of the other (active) transport channel. That is, even though the value of the target $SIR_2$ for the transport channel $TrCH_2$ exceeds the target $SIR_1$ for the inactive transport channel $TrCH_1$ (shown at the crossover point time $t_x$), the target $SIR_1$ continues to be reduced to the initial value.

In this situation, the target value $SIR_{target}$ used for the inner-loop power control 16 follows the highest target at any given time. That is, it follows the target $SIR_1$ until the crossover point and then follows the target $SIR_2$.

According to a further variant, it is possible to allow the target $SIR_1$ to continue to be reduced to the initial value and simultaneously exclude it from any consideration in determining the target $SIR_{target}$ for the inner-loop power control.

The advantage of the above-described embodiments of the invention is that the SIR target used for inner-loop power control, which is derived from the SIR targets of the individual TrCHs, will be affected only by those TrCHs which are active. This is particularly important for the typical case where there are two TrCHs, one carrying a Signaling Radio Bearer (SRB) whose activity is bursty, with large periods of inactivity, and the other carrying a Radio Bearer (RB) with user data. Depending on the block size of the SRB and the channel coding scheme used for the SRB transport channel, the SRB may require a higher SIR than the RB. When the SRB is active, then the DPCH's SIR target should be high enough to service the SRB, but when it is not, then the DPCH SIR target should be able to take into account only the RB's target.

What is claimed is:

1. A method of power control in a wireless communication system wherein blocks are transmitted from a transmitter to a receiver on multiple wireless transport channels, the method comprising comparing a target signal quality value with a received signal quality value and providing the results of the comparing step in the transmitter to adjust transmit power based on the comparing step, the method comprising the steps of:

determining individual target values for each of said multiple wireless transport channels;

determining if one of said multiple wireless transport channels has been inactive for a period and, if so, providing said target signal quality value at a level which is lower than an individual target value for the inactive transport channel in the case where the individual target value of the inactive transport channel exceeds a highest individual target value for active transport channels, and providing said target signal quality value at a level which is corresponding to the individual target value for the active transport channels in the case where the highest individual target value of the active transport channel exceeds the individual target value for the inactive transport channel; and deriving said target signal quality value from said individual target values including the individual target value of the inactive transport channel.

2. A method according to claim 1, comprising the step of, at the end of the period of inactivity, reducing the target value of the inactive transport channel by a predetermined amount.

3. A method according to claim 1, wherein the target signal quality value is derived from said multiple individual target values by taking the greater one of the target values.

4. A method according to claim 1, wherein the target signal quality value is a signal to interference plus noise ratio for the channel.

5. A method according to claim 1, comprising the step of estimating the received signal quality value.

6. A method according to claim 1, wherein the period of inactivity is monitored by counting the number of transmission time intervals during which no block is detected.

7. A method according to claim 1, wherein the period of inactivity is monitored by counting the number of radio frames during which no block is detected.

8. A receiver for use in a wireless communication system wherein blocks are transmitted from a transmitter to the receiver on multiple wireless transport channels, the receiver comprising:

means for comparing a target signal quality value with a received signal quality value and providing the results of the comparing step to the transmitter to adjust transmit power based on the comparing step;

means for determining individual target values for each of said multiple wireless transport channels;

means for determining if one of said multiple wireless transport channels has been inactive for a period of inactivity and if so, deriving said target signal quality value using the individual target value of the inactive transport channel for the period of inactivity; and means for following the expiry of the period of inactivity, deriving said target signal quality value from said individual target values, wherein the target value of the inactive transport channel is removed from said individual target values which are used to derive said target signal quality value for an inner-loop power control.

9. A method according to claim 8, comprising the step of, after a further time period of inactivity, reducing the target value of the inactive transport channel further by said predetermined amount or a different predetermined amount.

10. A method according to claim 8, wherein when the target value of the inactive transport channel falls below the target value of the active transport channel, no further reductions are made to the target value of the inactive transport channel.

11. A method according to claim 8, wherein the target value of the inactive transport channel is reduced to an initial target value.

12. A receiver for use in a wireless communication system wherein blocks are transmitted from a transmitter to the receiver on multiple wireless transport channels, the receiver comprising:

an inner-loop power control mechanism operable to compare a target signal quality value with a received signal quality value and provide results of the comparing step to the transmitter to adjust transmit power;

means of storing individual target values for each of said multiple wireless transport channels;

means for monitoring receipt of blocks to determine if one of said multiple wireless transport channels has been inactive for a period and, if so, providing said target signal quality value at a level which is lower than an individual target value for the inactive transport channel in the case where the individual target value of the inactive transport channel exceeds a highest individual target value for active transport channels, and providing said target signal quality value at a level which is corresponding to the individual target value for the active transport channels in the case where the highest individual target value of the active transport channel exceeds the individual target value for the inactive transport channel; and an outer-loop power control mechanism operable to derive said target signal quality value from said individual target values including the individual target value of the inactive transport channel.

13. A receiver according to claim 12, wherein said monitoring means comprises a timer function.

14. A receiver according to claim 12, wherein the target signal quality value is a signal to interference plus noise ratio for the channel.

15. A receiver according to claim 12, comprising means for estimating the received signal quality value.

16. A receiver according to claim 12, wherein the monitoring means comprises means for counting the number of transmission time intervals during which no block is detected.

17. A wireless communication system comprising a transmitter arranged to transmit wireless data on multiple transport channels and a receiver according to claim 12.

18. A wireless communication system according to claim 17, wherein the results of the comparing step are provided to the transmitter via a wireless transmission channel.

19. A method of power control in a wireless communication system wherein blocks are transmitted from a transmitter to a receiver on multiple wireless transport channels, the method comprising:

comparing a target signal quality value with a received signal quality value and providing the results of the comparing step to the transmitter to adjust transmit power based on the comparing step;

determining individual target values for each of said multiple wireless transport channels;

determining if one of said multiple wireless transport channels has been inactive for a period of inactivity and if so, deriving said target signal quality value using the individual target value of the inactive transport channel for the period of inactivity; and following the expiry of the period of inactivity, deriving said target signal quality value from said individual target values, wherein the target value of the inactive transport channel is removed from said individual target values which are used to derive said target signal quality value for an inner-loop power control.

* * * * *